US012596954B2

(12) United States Patent
Corleto et al.

(10) Patent No.: US 12,596,954 B2
(45) Date of Patent: Apr. 7, 2026

(54) MACHINE LEARNING FOR MANAGEMENT OF POSITIONING TECHNIQUES AND RADIO FREQUENCY USAGE

(71) Applicant: Cisco Technology, Inc., San Jose, CA (US)

(72) Inventors: Gino M. Corleto, Pattensen (DE); Robert E. Barton, Richmond (CA); Jerome Henry, Pittsboro, NC (US); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 986 days.

(21) Appl. No.: 17/804,513

(22) Filed: May 27, 2022

(65) Prior Publication Data

US 2023/0385684 A1    Nov. 30, 2023

(51) Int. Cl.
*G06N 20/00*    (2019.01)

(52) U.S. Cl.
CPC .................................... *G06N 20/00* (2019.01)

(58) Field of Classification Search
CPC ..................................................... G06N 20/00
USPC ......................................................... 706/12
See application file for complete search history.

(56) References Cited

U.S. PATENT DOCUMENTS

| | | | | |
|---|---|---|---|---|
| 10,794,983 | B1 * | 10/2020 | Chandail | G01S 5/0278 |
| 10,908,299 | B1 * | 2/2021 | Tadayon | G01S 5/0027 |
| 10,983,219 | B2 | 4/2021 | Kotov et al. | |

| | | | | |
|---|---|---|---|---|
| 2007/0178913 | A1 * | 8/2007 | Niemenmaa | H04W 4/029 455/456.4 |
| 2007/0287473 | A1 * | 12/2007 | Dupray | H04W 4/029 455/456.1 |
| 2015/0186693 | A1 * | 7/2015 | Blair | G16H 40/20 340/10.1 |
| 2015/0237471 | A1 * | 8/2015 | Li | G01S 5/02521 455/456.2 |
| 2017/0312916 | A1 | 11/2017 | Williams et al. | |
| 2018/0102858 | A1 * | 4/2018 | Tiwari | H04L 67/566 |
| 2019/0197896 | A1 | 6/2019 | Bakhishev et al. | |
| 2020/0015189 | A1 * | 1/2020 | Mukherji | H04W 64/006 |

(Continued)

FOREIGN PATENT DOCUMENTS

| | | | | |
|---|---|---|---|---|
| WO | WO-2014093400 A1 * | 6/2014 | .......... | G01S 5/0218 |
| WO | 2020003319 A1 | 1/2020 | | |

OTHER PUBLICATIONS

Tahat et al., "A Look at the Recent Wireless Positioning Techniques With a Focus on Algorithms for Moving Receivers", IEEE Access, vol. 4, Nov. 8, 2016, pp. 6652-6680. (Year: 2016).*

(Continued)

*Primary Examiner* — Hwei-Min Lu
(74) *Attorney, Agent, or Firm* — Patterson + Sheridan, LLP

(57) ABSTRACT

Techniques for improved networking are provided. An indication that a mobile device is in a first region of a physical space is received, and one or more current exogenous factors are determined for the physical space. Positioning technique accuracy is predicted for each respective positioning technique of a plurality of positioning techniques by processing the indication of the first region and the one or more current exogenous factors using a machine learning model. A first positioning technique of the plurality of positioning techniques is selected based on the predicted positioning technique accuracies.

20 Claims, 9 Drawing Sheets

(56) References Cited

U.S. PATENT DOCUMENTS

| | | | |
|---|---|---|---|
| 2020/0096598 A1* | 3/2020 | Jadav | H04W 4/029 |
| 2020/0344572 A1* | 10/2020 | Wakabayashi | H04W 64/00 |
| 2021/0029500 A1 | 1/2021 | Ye et al. | |
| 2021/0044670 A1* | 2/2021 | Fänge | G01S 5/01 |
| 2021/0192768 A1* | 6/2021 | Tran | G06V 10/82 |
| 2022/0050133 A1 | 2/2022 | Newman et al. | |
| 2022/0171012 A1* | 6/2022 | Duan | G01S 5/0205 |
| 2022/0369070 A1* | 11/2022 | Feki | H04W 24/02 |

OTHER PUBLICATIONS

Jung, et al., "Performance Evaluation of Radio Map Construction Methods for Wi-Fi Positioning Systems", IEEE Transactions On Intelligent Transportation Systems, vol. 18, No. 4, Mar. 27, 2017, pp. 880-889. (Year: 2017).*
Li et al., "A Narrow-Band Indoor Positioning System by Fusing Time and Received Signal Strength via Ensemble Learning", IEEE Access, vol. 6, Mar. 15, 2018, pp. 9936-9950. (Year: 2018).*
Guo et al., "A Survey on Fusion-Based Indoor Positioning", IEEE Communications Surveys & Tutorials, vol. 22, No. 1, Mar. 11, 2020, pp. 566-594. (Year: 2020).*
Stefan Muckenhuber et al., "Automotive Lidar Modelling Approach Based on Material Properties and Lidar Capabilities," National Library of Medicine, dated Jun. 10, 2020.
Fernando Castaño et al., "Obstacle Recognition Based on Machine Learning for On-Chip LiDAR Sensors in a Cyber-Physical System," MDPI, dated Sep. 14, 2017, pp. 1-14.

* cited by examiner

300

305

Move to defined portion of
physical space

310

Record location
information

315

Capture image information

320

Transmit location
information and/or image
information

325

Receive indicated
positioning technique(s)

330

Selectively activate
positioning technique(s)

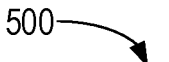
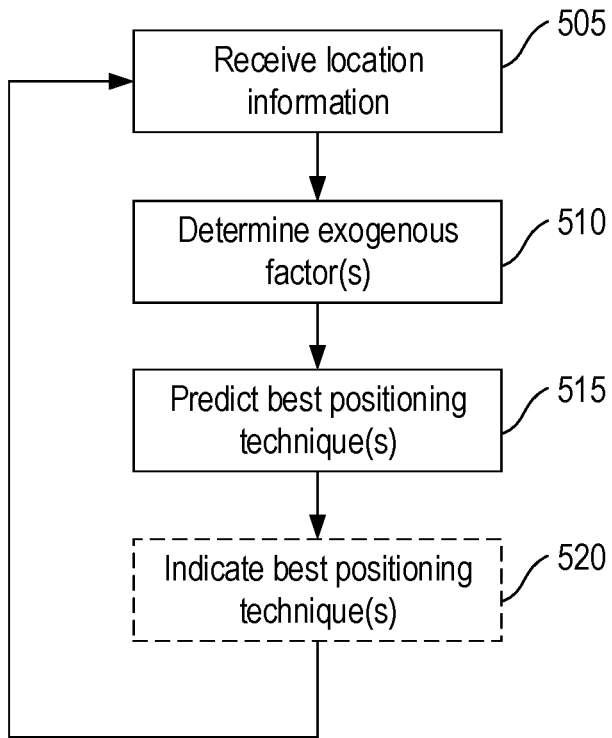
*FIG. 5*

600

Receive image information — 605

Identify depicted object(s) — 610

Classify material type(s) of depicted object(s) — 615

Determine RF characteristics based on material type(s) — 620

Generate RF model(s) based on RF characteristics — 625

630

Yes     Additional image information?

No

Deploy RF model(s) — 635

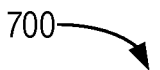

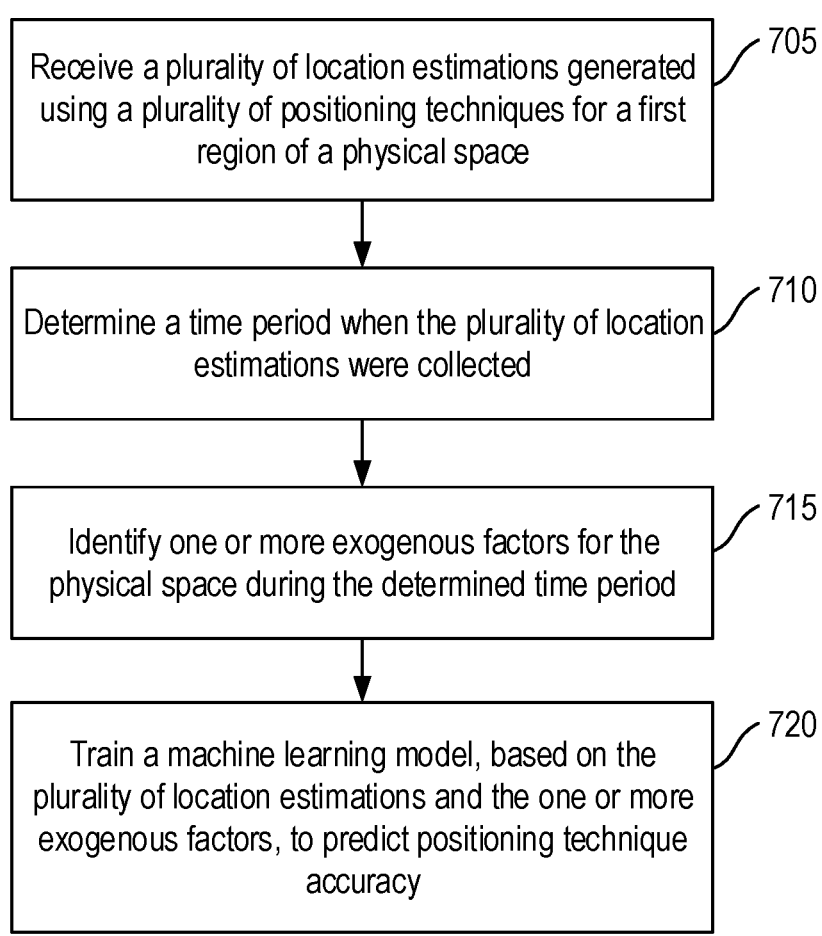

705

Receive a plurality of location estimations generated using a plurality of positioning techniques for a first region of a physical space

710

Determine a time period when the plurality of location estimations were collected

715

Identify one or more exogenous factors for the physical space during the determined time period

720

Train a machine learning model, based on the plurality of location estimations and the one or more exogenous factors, to predict positioning technique accuracy

*FIG. 7*

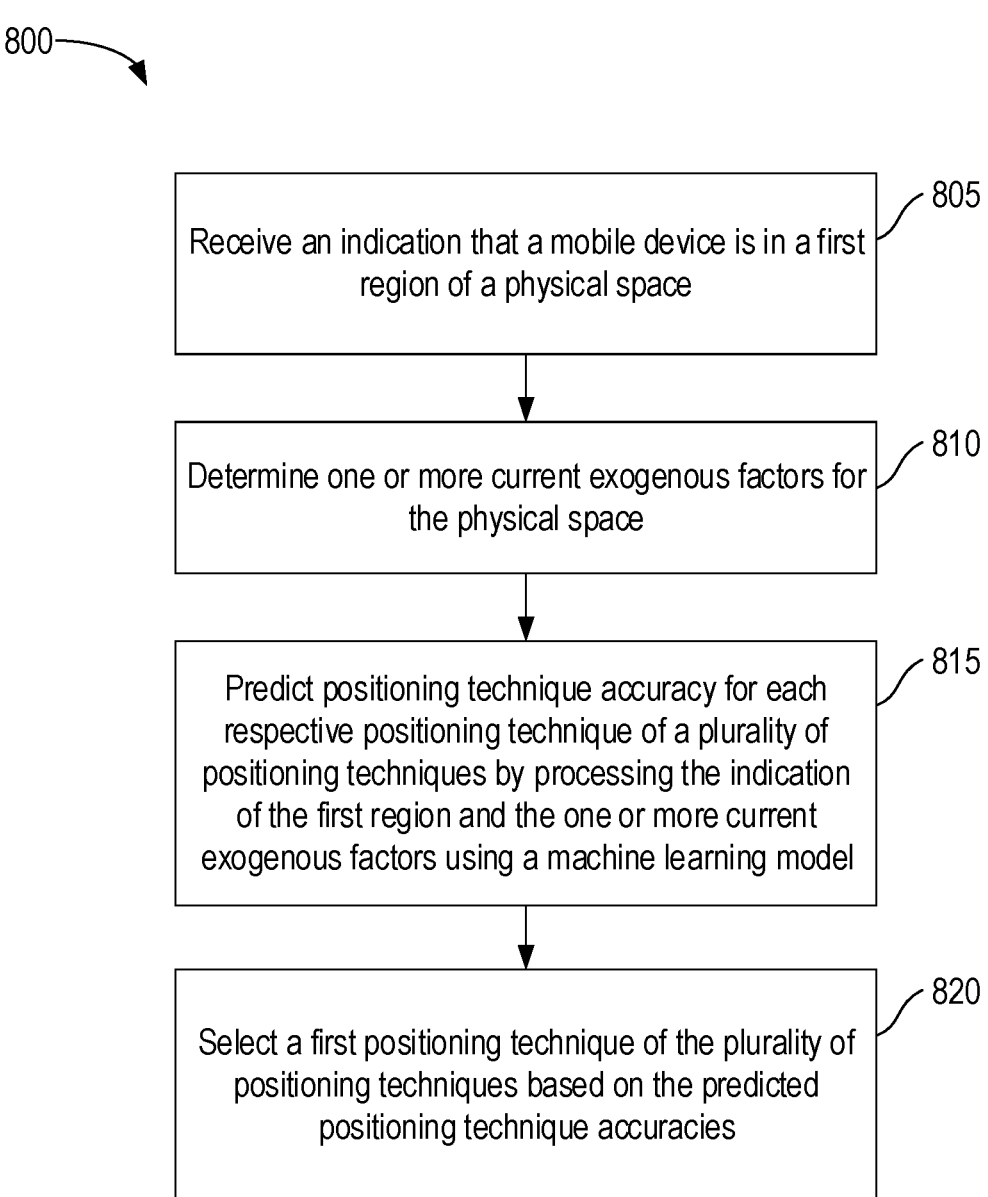

800

805
Receive an indication that a mobile device is in a first region of a physical space 810
Determine one or more current exogenous factors for the physical space 815
Predict positioning technique accuracy for each respective positioning technique of a plurality of positioning techniques by processing the indication of the first region and the one or more current exogenous factors using a machine learning model 820
Select a first positioning technique of the plurality of positioning techniques based on the predicted positioning technique accuracies

*FIG. 8*

MACHINE LEARNING FOR MANAGEMENT OF POSITIONING TECHNIQUES AND RADIO FREQUENCY USAGE

TECHNICAL FIELD

Embodiments presented in this disclosure generally relate to radio frequency (RF) systems. More specifically, embodiments disclosed herein relate to using dynamic modeling to drive improved management of RF and positioning systems.

BACKGROUND

In many given environments and systems, multiple methods of positioning (e.g., real-time locating solutions (RTLS)) may be employed, such as for asset tracking. For example, various devices may use techniques including angle-of-arrival (AoA) and/or angle-of-departure (AoD) based positioning, ultra-wideband (UWB) based positioning, global positioning systems (GPS), 5G location management function (LMF) positioning, time-of-flight (TOF) based positioning, and the like may be used. In many physical environments, the accuracy and reliability of each positioning technique can vary based on a wide variety variables, causing difficulty in performing accurate positioning. In conventional systems, when multiple techniques or methods of positioning are available, there are no techniques available to determine which method(s) provide the most accurate position estimation.

Additionally, obstacles and objects in the physical space (e.g., walls, shelves, equipment, and the like) can have a significant impact on the RF medium of wireless systems. For example, such objects can affect the path loss, absorption, reflectivity, and the like of RF signals in the space. Though intelligent RF management schemes can compensate for some of these concerns, conventional approaches require that users manually define the RF characteristics and attempt to provide optimal RF management. Such a manual process is slow and inherently inaccurate, resulting in suboptimal RF systems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 5 is a flow diagram depicting an example method for using machine learning models to provide improved management of positioning techniques.

FIG. 7 is a flow diagram depicting an example method for training machine learning models to improve positioning techniques.

FIG. 8 is a flow diagram depicting an example method for using machine learning to improve positioning techniques.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
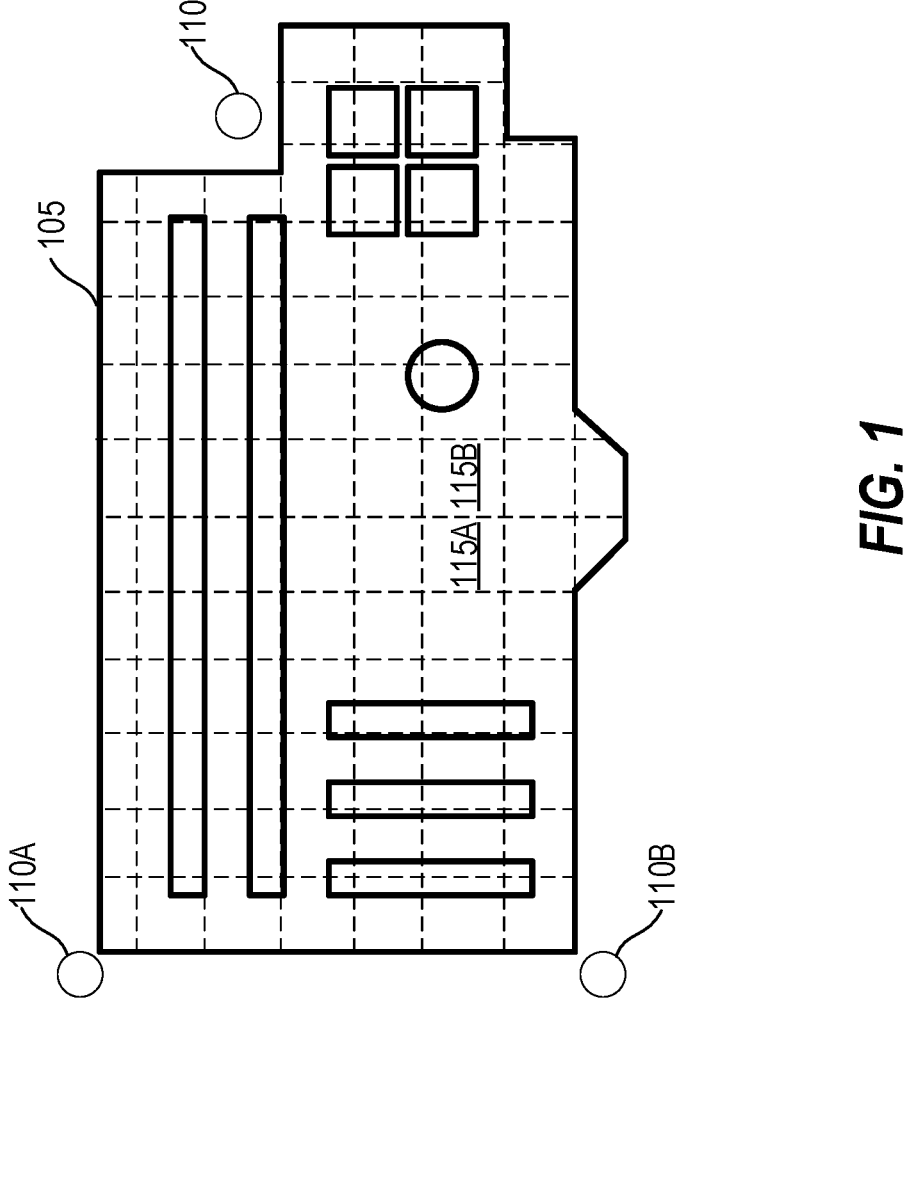
FIG. 1 depicts an example environment for using machine learning to improve management of positioning techniques and radio frequency usage.

One embodiment presented in this disclosure provides a method. The method includes: receiving a plurality of location estimations generated using a plurality of positioning techniques for a first region of a physical space; determining a time period when the plurality of location estimations were collected; identifying one or more exogenous factors for the physical space during the determined time period; and training a machine learning model, based on the plurality of location estimations and the one or more exogenous factors, to predict positioning technique accuracy.

One embodiment presented in this disclosure provides a method. The method includes: receiving an indication that a mobile device is in a first region of a physical space; determining one or more current exogenous factors for the physical space; predicting positioning technique accuracy for each respective positioning technique of a plurality of positioning techniques by processing the indication of the first region and the one or more current exogenous factors using a machine learning model; and selecting a first positioning technique of the plurality of positioning techniques based on the predicted positioning technique accuracies.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

EXAMPLE EMBODIMENTS

In embodiments of the present disclosure, specific techniques for data collection, evaluation, and machine learning are provided to improve management of RF systems, including RTLS operations and RF spectrum management.

In many physical environments, the optimal positioning technique (e.g., the most accurate) can vary according to a variety of factors, including the distance of a given position from the access point(s) (APs) in the space, the presence of nearby objects, the RF dynamics of the system at any moment in time, and the like. Even with respect to a single position in the space, the most accurate positioning technique may vary as other environmental factors change. In some embodiments of the present disclosure, techniques are provided to use machine learning for evaluation of available positioning techniques (e.g., various RTLS techniques) in order to provide the best location tracking accuracy at each position and time.

Additionally, in some embodiments, wireless systems can be enhanced with geospatial location modelling that provides details to the system about the physical environment, such as the locations of walls, elevator shafts, and the like. This type of modelling can play a significant role in helping controller-based RF management schemes (e.g., radio resource management (RRM)) to better compensate for the RF characteristics of the space, such as path loss, absorption, reflectivity of surfaces, and the like. In addition, having an improved understanding of the RF properties of the physical environment can help positioning techniques provide improved accuracy.

In some embodiments, mobile devices (e.g., autonomous drones) moving in a physical space can collect a variety of information related to the RF environment. This information can then be used to build dynamic and accurate models that can be used to drive improved positioning and RF management.

For example, in some embodiments, the mobile devices can collect positioning information and provide it to a centralized system (e.g., a controller or other system). In one such embodiment, the precise or actual location of the robot can be tracked or determined (e.g., via barcodes and/or QR codes in the environment). In tandem, the mobile device can be used as a location tracking measurement tool for a variety of available positioning techniques. These techniques may include technologies that are on-board the device itself (such as timing measurement (TM) and/or fine timing measurement (FTM) approaches, LIDAR-based position estimation, and the like) and/or off-board techniques (such as received signal strength indicator (RSSI)-based AP trilateration). As each individual device moves throughout the environment, it can periodically or continually report back its actual location, as well as any on-board location estimations. In parallel, the various infrastructure-based positioning systems can estimate the location of each device for any off-board methods. These position estimations can then be used, along with the known actual location, to train one or more machine learning models. Through this learning, the models can be used to predict which positioning technique(s) are most accurate and/or reliable for each position in the physical space. In some embodiments, exogenous factors such as the time of day or state of the RF medium can also be used as input to the model(s).

In some embodiments, the mobile devices can additionally or alternatively collect image data as they traverse the space. For example, the devices may capture image(s) in various positions, and machine learning models can be used to identify objects depicted in the image(s), as well as to determine or infer the material type of each object. The system can then construct an RF model (also referred to as an RF propagation model) based on the known RF characteristics of each detected object, and use this model to improve RF management and positioning accuracy.

FIG. 1 depicts an example environment 100 for using machine learning to improve management of positioning techniques and radio frequency usage. In the illustrated example, a physical space 105 is associated with a set of one or more APs 110A-C. The APs 110 may generally be used to provide wireless connectivity in the physical space 105. For example, the APs 110 may be used to provide a wireless local area network (WLAN), such as using WiFi™. In some aspects, the APs 110 can be used to provide positioning operations (e.g., using RTLS techniques). For example, the APs 110 may be able to perform FTM or provide other ranging or position estimates to devices in the physical space 105. Though three APs 110 are depicted for conceptual clarity, in embodiments, there may be any number of APs 110 serving the physical space 105.

In the illustrated example, the physical space 105 is delineated (indicated by the dashed lines) into a grid of regions or areas. That is, as indicated by the dashed lines, the physical space 105 can include a set of discrete regions 115. Two such regions 115, indicated as region 115A and region 1158, are numbered for conceptual clarity, though it is to be understood that each region (e.g., each grid cell) can have a corresponding identification or identifier. In some embodiments, the regions 115 are defined as logical spaces rather than being physically delineated. That is, the regions 115 may not actually be indicated by any physical demarcations (e.g., lines) in the physical space 105.

In an embodiment, mobile devices moving in the physical space 105 can be used to collect information for each region 115 they traverse. In some embodiments, the mobile devices can include autonomous systems, such as robots or drones. For example, robots used to transport objects in the physical space 105 (e.g., between shelves, from shelving to a work area, and the like) can be used to provide the information.

In some embodiments, the mobile device(s) are used to survey the wireless environment, exploring in succession each region 115 of the grid (e.g., by traveling to it and collecting various information discussed in more detail below). In one such embodiment, the device can explore each region 115 in succession or order. In another embodiment, the device can use various adaptive exploration algorithms (such as adaptive random search, hill climbing, variable neighborhood search, and the like), with the goal of exploring faster neighboring regions 115 that may present the same or a similar outcome (e.g., comparable accuracy level in both regions 115 for a given positioning technique). In some embodiments, the device can traverse the physical space 115 guided by a separate application or operation (e.g., warehouse delivery), and survey the physical space 105 as the device passes through regions 115 during normal operations.

In some embodiments, the mobile devices can determine their actual position in the physical space 105, as well as one or more position estimates. For example, using barcodes or QR codes on the ground (e.g., one for each region 115), the device may determine its actual location in the physical space 105. Additionally, using RTLS techniques such as AoA analysis, FTM positioning, and the like, the device (or the APs 110 or another system) may generate one or more location estimations for the device. In an embodiment, using these know locations and position estimations, a machine learning model can be trained to predict or identify which positioning technique is likely to be most accurate for each region 115 of the physical space 105, as discussed in more detail below.

In some embodiments, in addition to or instead of collecting positioning information, the mobile device(s) can collect image information. For example, the devices may use one or more camera or other imaging devices to capture images as they traverse the physical space 105. These images can then be evaluated automatically (either locally by the mobile device, or by one or more other systems) to identify and classify the depicted objects (e.g., shelving, walls, elevators, forklifts, and the like). This object information can be used to construct RF propagation models of the space, as discussed in more detail below. In at least one embodiment, the system can use the provided location and/or image information to learn as objects in the space move. For example, the system may use regression or other techniques to learn the RF properties (e.g., based on the presence of various objects) at different times, and thereby generate dynamic RF models that account for these exogenous factors.

In some embodiments, the models can be deployed to improve the operations of the wireless network itself, as well as the positioning of the devices in the space. For example, the RF model(s) can be used to drive RF management (e.g., using RRM) that better accounts for the actual RF characteristics of the space at any given point in time and region 115 in the physical space 105. This can improve the throughput and latency of the network. Further, mobile devices may be configured to use specific positioning techniques based at least in part on the specific region 115 where they are (e.g., using trained machine learning models). This allows for significantly improved positioning estimations.

In at least one embodiment, the mobile device(s) may selectively activate (and deactivate) the positioning systems based on their location. For example, if a given positioning technique uses a specific radio or other system on the mobile device, but the specific technique is not accurate in a given region 115 (or collection of regions), the mobile device may selectively deactivate the corresponding radio or other systems in favor of more accurate techniques. This can reduce power consumption and use of computational resources (e.g., processor time) of the mobile device and/or APs 110, thereby improving the operations of each.

Figure 2:
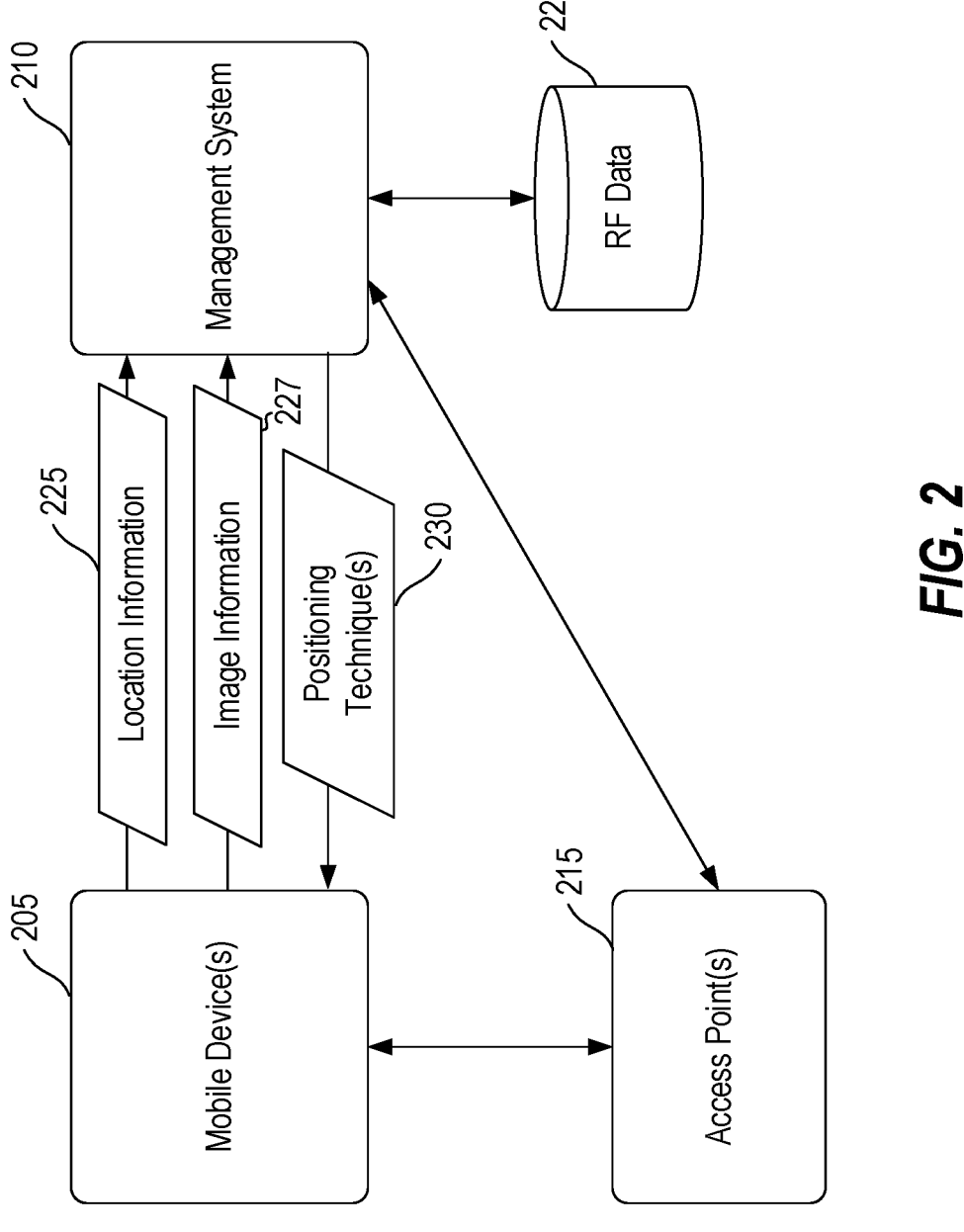
FIG. 2 depicts an example system for using machine learning to improve management of positioning techniques and radio frequency usage.

FIG. 2 depicts an example system for using machine learning to improve management of positioning techniques and radio frequency usage.

In the illustrated example, one or more mobile devices 205 are communicatively coupled with a management system 210, as well as one or more APs 215 (which may correspond to the APs 110 of FIG. 1). In one embodiment, the communication links can include one or more wireless links, allowing the mobile devices 205 to traverse a physical space. In some embodiments, the mobile devices 205 correspond to autonomous robots or drones, as discussed above. For example, the mobile devices 205 may include robots configured to drive or otherwise move around physical spaces, either for the dedicated purpose of collecting information (e.g., location estimates and/or image data) or for other purposes (such as to move items around a warehouse).

Although the illustrated example depicts a direct link between the mobile devices 205 and APs 215 for conceptual clarity, in some aspects, the mobile devices 205 may be communicatively coupled with the management system 210 via one or more intermediaries, which may include the APs 215. That is, the mobile device(s) 205 may transmit data to the APs 215, which then forward it to the management system 210.

Although depicted as a discrete device for conceptual clarity, in embodiments, the operations of the management system 210 may be implemented using hardware, software, or a combination of hardware and software, and may be implemented as part of another device or system. For example, in at least one embodiment, the management system 210 corresponds to or is implemented by a unified positioning or RTLS system, a controller for the wireless network, and the like.

In some embodiments, as the mobile device(s) 205 move through the space, they can record their actual location or region in the physical space (e.g., indicating that they are in a particular grid block, such as using barcodes or QR codes in the space, as discussed above. Additionally as discussed above, the mobile device 205 may use various positioning techniques such as AoA or AoD-based techniques, ToF techniques, GPS, and the like to generate position estimations. In at least one aspect, for each alternative positioning technique that the mobile device 205 is capable of using, a corresponding position estimate is generated. For example, the mobile device 205 may generate a first position estimate using UWB, a second position estimate using GPS, and so on. In some embodiments, as discussed above, some or all of the APs 215 may additionally or alternatively provide one or more position estimates for the mobile device 205.

In the illustrated example, the mobile device 205 (and the AP 215, in some aspects) transmits location information 225 to the management system 210. This location information 225 can include, for example, an indication as to the known or actual location of the mobile device 205 (e.g., the specific region 115 of FIG. 1, which may be determined using various techniques such as image recognition, barcodes or QR codes, and the like), as well as one or more position estimates (each generated using a corresponding positioning technique or system). In some embodiments, if the APs 215 perform any positioning operations, they can additionally or alternatively provide the generated estimates to the management system 210.

In an embodiment, the management system 210 is can record the predicted location generated using each positioning method, along with the precise known location of the mobile device 205 (e.g., in the RF data 220). This information can be used as a training exemplar, as discussed in more detail below, to train machine learning models to predict the best or most accurate positioning technique for each region in the physical space.

In some embodiments, in addition to the location information 225, as location information 225 sets are recorded for each region, other independent available data (referred to as exogenous data in some embodiments) can be collected by the management system 210. For example, based on the time when the location information 225 was collected, the management system 210 may determine factors such as the time of day when it was captured, the day of week it was captured, the actual distance the mobile device 205 was from one or more APs 215 (e.g., based on a planned route of the mobile device at the time, and the like.

In some embodiments, the exogenous data can also include information relating to the state of the network itself, such as the signal-to-noise ratio (SNR) of the communication link between the mobile device 205 and the AP(s) 215 and/or management system 210, the received signal strength indicator (RSSI) of such connection(s), the current channel utilization of the network at the time the location information 225 was collected, the number of client devices connected to the network or otherwise present in the physical space at the time, and the like.

These exogenous factors can have varying effects on the accuracy of the positioning techniques. In some embodiments, therefore, the management system 210 can collect such exogenous data and link it to the location information 225 (e.g., based on timestamps) in order to augment the training data. The exogenous data can be used as input to the model, as discussed below in more detail, to improve the accuracy of the predictions.

In the illustrated system, as the mobile device(s) 205 move throughout the environment, they can therefore be used to survey each grid block or region, recording location information 225 for each portion of the space. In some embodiments, a group or swarm of mobile devices 205 can be used to repeatedly survey the environment (e.g., at different times of day, on different days of the week, under different RF conditions, and the like). As discussed below in more detail, the collected data (which may include exogenous data) can be used as input to train a machine learning (ML) model. By using the mobile devices 205, the management system 210 is able to generate a robust and complete training set, which may encompass all regions of the space, each region being sampled some minimum threshold number of times and/or duration of time (e.g., at least five data samples, or at least one minute of data). In embodiments, the machine learning model can use a variety of architectures including a regression model, an artificial neural network, and the like.

In some embodiments, once the RF data 220 (e.g., the set of exemplars including location information 225 and exogenous data from the physical space) are used to train one or more machine learning models, the management system 210 may use these models for a variety of management operations. In at least one embodiment, after the training is complete, one or more pooling operations can be used on the models or predictions. In one such embodiment, pooling is used to merge neighboring regions where the predicted positioning technique accuracy (or accuracies, for multiple techniques) are within a defined threshold. For example, using the machine learning model, the management system 210 may, for each region, identify the positioning technique(s) that are predicted to have the highest accuracy. The management system 210 can then identify any neighboring regions that are also predicted to have the same positioning technique as the most accurate. By pooling such regions, the size of the model may be reduced while maintaining reliability (e.g., by combining these regions into a single region for subsequent training, refinement, and/or prediction purposes).

In some embodiments, such pooling can additionally enable the regions to have differing sizes depending on the model. For example, regions in an empty portion of a physical space may all share the same optimal positioning technique, while regions near obstacles may be smaller to enable more granular selection of positioning techniques.

In at least one embodiment, the pooling can additionally or alternatively be used to consider mobile objects as independent contributors to the RF space. For example, the grid size may be dynamically be resized based on mobile objects, such as where the proximity or presence of an object to a given zone or area with large cells causes the region to break in smaller units. Once the object has left the area, in an embodiment, the regions may be merged to regain their larger size (e.g., using gravitational pull techniques).

In some embodiments, the management system 210 can additionally or alternatively use one or more rectifier techniques to resolve neighborhood conflicts (e.g., where one region is predicted to use one technique for the most accurate positions, and a neighboring region is predicted to use another technique). For example, suppose a Bluetooth™ low energy (BLE)-based technique is predicted to be the most accurate for a first region, and a WiFi™-based technique is predicted to the most accurate for a neighboring region. Suppose further that a mobile device 205 is located with BLE (returning a likely position in the first region) and with WiFi™ (returning a likely position in the neighboring region). In one embodiment, management system 210 can compare the accuracy of each technique in the regions, and apply a linear degradation (e.g., using Bayesian estimates) from one region and one technique to the next region and technique. In the above example, the management system 210 may then select the technique (e.g., WiFi™ or BLE) that offers the best aggregate accuracy likelihood in both regions.

In embodiments, using the model, the management system 210 is therefore able to determine which of the available positioning methods is likely to be the most accurate, and therefore more trustable, for each region of the space and under different exogenous circumstances (e.g., different RF states of the network). In one such embodiment, for any given device that can be located using more than one positioning technology, the management system 210 can select the position estimate returned by the most reliable technology in that specific area and at that specific time.

In some embodiments, as discussed above, the mobile devices 205 can additionally or alternatively use the predictions to selectively activate (and deactivate) the positioning techniques. For example, if the management system 210 predicts that a given technique is not reliable in the region (and therefore will not be used), the mobile device 205 may deactivate or otherwise refrain from using the indicated technique in the region. This can significantly reduce the burden on the mobile devices 205 and/or APs 215 (e.g., via reduced power consumption and computational resource usage, reduced network bandwidth dedicated to inaccurate positioning techniques, and the like).

As illustrated, the management system 210 can transmit this information back to the mobile device(s) 205 as positioning techniques 230. For example, the positioning techniques 230 may indicate which technique(s) should be used in the region indicated by the location information 225, the predicted most-accurate location estimation for the device at the time, which techniques should not be used (e.g., which systems should be deactivated in the region), and the like.

In some embodiments, as discussed above, the mobile devices 205 can additional or alternatively collect image data. As illustrated, the mobile devices 205 can provide this image information 227 to the management system 210. In embodiments, the images may be evaluated locally by the mobile device 205, and/or by the management system 210. For example, if the management system 210 performs the analysis, the image information 227 can include the image(s) themselves.

In an embodiment, an image classifier model (e.g. a convolutional neural network) can be trained to identify defined objects that are common or present in the physical space (e.g., in an industrial setting). For example, the classifier may trained to identify objects such as forklifts, people, walls made of concrete, walls covered with drywall, specific types of machines, shelves made of various materials, elevators, and the like. In at least one embodiment, the image classifier is trained to identify objects related to the physical space where it is deployed, such that objects in the facility can be correctly identified. In some embodiments, the management system 210 can train this model (e.g., using labeled data provided by an administrator). In other embodiments, the management system 210 may use a pre-trained classifier model.

In some embodiments, the computer vision classifier model can then be deployed (e.g., on the mobile devices 205, and/or on the management system 210). As discussed above, the precise location of the mobile device 205 can be determined as it moves through the facility. As the mobile device 205 conducts its survey, different objects can be observed/ identified by an imaging sensor, and identified using the classifier. In one such embodiment, as objects are classified (identified), a tag or label can be associated with the detected object (along with the location of the object, which may be ascertained by the mobile device 205 using various techniques, such as rangefinders).

For example, the image information 227 may report that a concrete wall is discovered at specific coordinates, along with the estimated size of the wall. In this way, the management system 210 can not only classify objects around the facility based on their material type (e.g., based on their impact on the RF spectrum), but also determine the precise location and/or size (which may be determined, for example, as the mobile device 205 moves past the object and can estimates its size by way of geometric comparison).

As the mobile devices 205 move through the facility, the image information 227 can be reported to the management system 210 used by the wireless system. In one such embodiment, the management system 210 stores this information as object tracking data in the RF data 220 (e.g., as an index of detected objects and material types, and their associated RF characteristics, such as typical RF absorption, reflectivity, path loss, and the like).

In an embodiment, as discussed in more detail below, the management system 210 can use this RF data 220 to generate an RF model (e.g., a heatmap of the facility, where walls and object material types/shapes are defined). That is, the management system 210 can leverage the RF data 220 (which includes object tags discovered by the mobile devices 205, their location, and their RF characteristics) to dynamically generate and augment the predictive RF model (e.g., heatmap). In this way, the management system 210 (or another system, such as a wireless controller) can use the RF model for both RRM and RTLS calculations.

In some embodiments, discovered objects that are known to be mobile (e.g., on a predefined list of movable or mobile objects), such as people, scooters, forklifts, trucks, and the like, can be automatically removed from any RF calculations and not included in the RF model. That is, as these mobile objects are transitory and may artificially skew the RF state (e.g., path loss and RTLS calculations), the management system 210 may refrain from including them when generating the RF model.

In at least one embodiments, once the mobile device(s) 205 have competed subsequent surveys, the management system 210 may learn predictable patterns of these objects and build up a model that allows dynamic placement of moving things at specific times. That is, the management system 210 may train a machine learning model (e.g., a regression model) to predict when mobile objects will be present or absent (e.g., a time of day and/or day of the week) based on the collected observations over time. For example, if the management system 210 determines that a fleet of container trucks arrive at 1:00 pm on Tuesdays and Thursdays at the loading dock, the management system 210 can be trained to place these objects (in the RF model) in the predicted locations only during these times. Both the RRM and RTLS system can then be adjusted accordingly during these periods, based on the RF model.

In some embodiments, the management system 210 can additionally enable user feedback to refine the models and operations. For example, though the image classifier may be highly accurate, the management system 210 may allow users to indicate errors in the classifications. In at least one embodiment, the management system 210 can automatically identify potential errors (e.g., if the model generates a classification with a confidence score below a threshold), and flag these classifications to a user or administrator (e.g., asking for confirmation or correction). When the user responds (confirming or correcting the classification), the management system 210 may use this feedback to refine the classification model further, improving its subsequent accuracy. Similarly, in some embodiments, the management system 210 allows users to manually tweak the RF model and/or the resulting parameters (e.g., path loss estimates) if needed.

Figure 3:
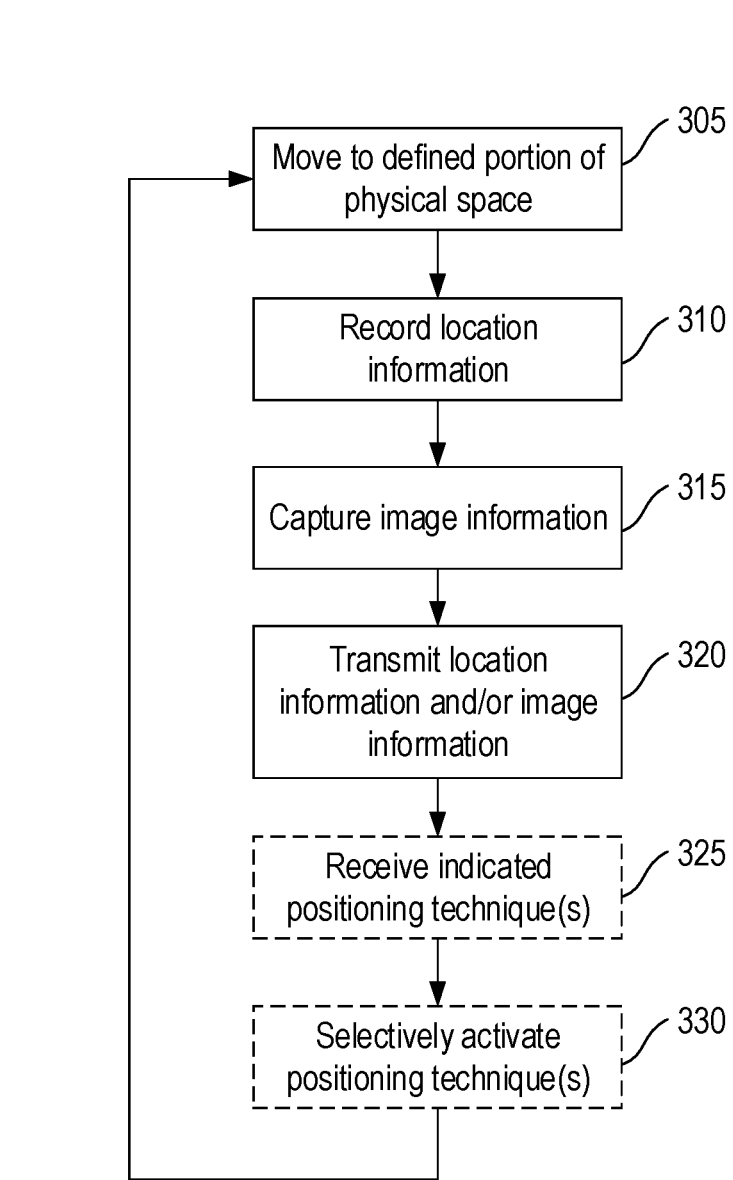
FIG. 3 is a flow diagram depicting an example method for using mobile devices to collect information for improved management of positioning techniques and radio frequency usage.

FIG. 3 is a flow diagram depicting an example method 300 for using mobile devices to collect information for improved management of positioning techniques and radio frequency usage. In some embodiments, the method 300 is performed by a mobile device, such as mobile device 205 of FIG. 2.

At block 305, the mobile device moves to a defined portion or region of a physical space. For example, as discussed above with reference to FIG. 1, the mobile device may move into or through one or more regions 115. Generally, the defined portion or region corresponds to an identifiable area or location in the physical space. In at least one embodiment, as discussed above, the region is identifiable using visual recognition, such as via a barcode or QR code on the ground in a grid cell.

In some embodiments, as discussed above, the mobile device moves to the defined portion for the purpose of collecting location and/or image information. For example, the mobile device may be configured to travel to each region in sequence, collecting information for each, or may use one or more adaptive exploration algorithms to select the next region for evaluation. In at least one embodiment, the mobile device moves to the defined region based on other criteria or operations. That is, the mobile device may be tasked with performing other operations (such as moving goods around a warehouse), and may move to the defined region as part of this task.

At block 310, once in the defined region, the mobile device can record location information for the region. In at least one embodiment, as discussed above, the location information includes an actual or ground-truth location (e.g., determined by scanning the barcode or QR code on the ground to identify the location of the mobile device). In some embodiments, the location information can include one or more position estimations, each collected or generated using a respective positioning or locationing technique (e.g., an RTLS technique). For example, one position estimation may be generated using a GPS system on the mobile device, while a second position estimation is generated using FTM to one or more APs. In some embodiments, some or all of the position estimations may be generated by other systems (such as by an AP). Such off-device position estimations may be transmitted to the mobile device for inclusion in the recorded location information, or may be directly provided to an analysis system (e.g., to the management system 210 of FIG. 2).

At block 315, the mobile device can capture image information in the defined portion or region of the space. For example, the mobile device may use one or more imaging sensors to capture one or more images or videos of the region and/or surrounding regions. In some embodiments, the mobile device can itself evaluate these images to detect objects and/or classify them based on material type, as discussed above. In other embodiments, the mobile device can transmit the images to another system for such evaluation. In at least one embodiment, the mobile device can further determine or estimate the size and positioning of the objects. For example, the mobile device may determine that a given object (e.g., a wall) is a specific distance from the location (e.g., using a rangefinder), and/or may determine that the object is a specific size (e.g., by driving or moving along it until reaching the end).

At block 320, the mobile device transmits the collected location information and/or image information to another system, such as the management system 210 of FIG. 2. As discussed above, this may include transmitting the ground-truth location in the space (e.g., the specific region), one or more position estimations generated in the region, one or more images captured in the region, and/or the results of evaluating one or more images (e.g., a set of detected and/or classified objects and their characteristics, locations, and sizes).

At block 325, the mobile device can optionally receive one or more indicated positioning techniques. For example, as discussed above, the management system may use a machine learning model to predict or determine which positioning technique is likely to be most accurate for the specific region, and indicate (to the mobile device) that this positioning technique should be used. In some embodiments, the management system does so by processing the location information (e.g., the ground-truth region and/or the position estimations) using the machine learning model.

In at least one embodiment, the management system can evaluate the position estimations to select the best one, in view of the prior training. For example, as discussed above, the mobile device may identify the region indicated by each position estimation, and determine the most accurate positioning technique for each region (e.g., based on the output of the machine learning model). In some embodiments, in the case of conflict (e.g., where two or more positioning techniques are possible, such as when neighboring regions have different optimal techniques and both regions are indicated in the positioning estimations), the mobile device can use various techniques such as Bayesian estimates to determine which technique has the highest aggregate accuracy across the multiple regions and alternative techniques.

The mobile device can use the indicated positioning technique(s) to ensure that its location estimations are more accurate, thereby improving the operations of the mobile device.

At block 330, the mobile device optionally selectively activates one or more positioning techniques, based on the indicated positioning techniques. For example, if the received data indicates that a first technique is most accurate, the mobile device may disable other techniques to reduce power consumption and computational expense.

In some embodiments, blocks 305, 310, 315, and 320 are performed during an initial or data-collection phase, while blocks 325 and 330 can be performed during subsequent runtime operations (e.g., after the model is trained. In at least one embodiment, blocks 325 and 330 may be performed by other devices that do not participate in the data collection. For example, dedicated data-collection devices may periodically perform blocks 305, 310, 315, and 320 (e.g., overnight), and devices configured to perform other operations (such as moving items around a warehouse) may perform blocks 325 and/or 330 during runtime (e.g., during the day).

The method 300 then returns to block 305 to begin anew with a new region in the physical space (e.g., where the mobile device moves to another region to perform data collection).

Figure 4:
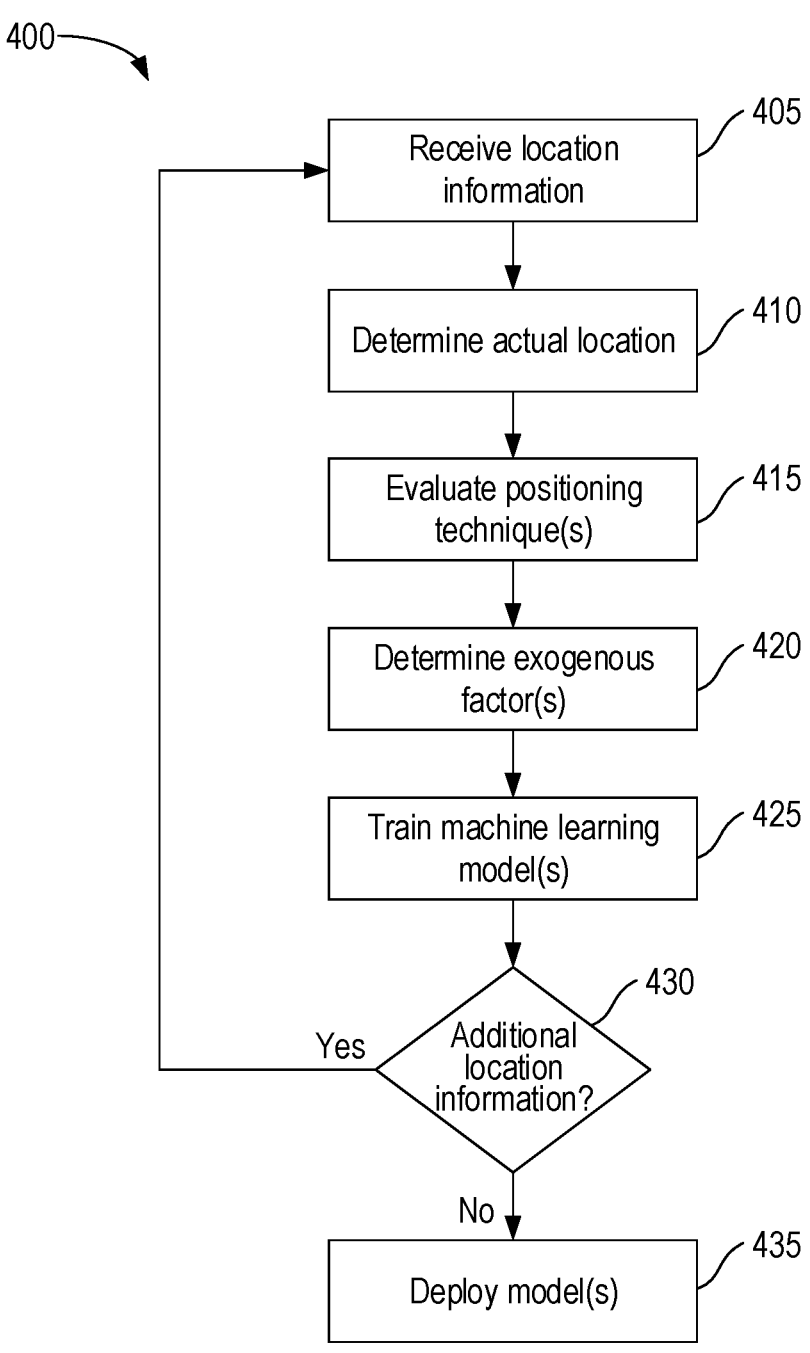
FIG. 4 is a flow diagram depicting an example method for training machine learning models to improve selection and use of positioning techniques.

FIG. 4 is a flow diagram depicting an example method 400 for training machine learning models to improve selection and use of positioning techniques. In some embodiments, the method 400 is performed by a management system, such as the management system 210 of FIG. 2.

At block 405, the management system receives location information from one or more mobile devices. For example, as discussed above, the location information may include a ground-truth or accurate location (e.g., determined when the mobile device by scans a barcode or QR code in a region), and a set of one or more position estimations (generated using various RTLS techniques).

At block 410, the management system determines, from the location information, the actual location of the mobile device. At block 415, the management system then evaluates the various positioning techniques based on the determined actual location. For example, the management system may determine or compute, for each location estimation, the distance between the estimated location and the actual location. These distance may be used to identify the most accurate position estimation, and to train the machine learning model.

At block 420, the management system determines one or more exogenous factors that correspond to the location information. For example, as discussed above, the management system may determine the time of day when the data was collected, the day of the week, the RSSI and/or SNR of the mobile device at the time, the channel utilization in the network at the time, the number of devices in the space and/or connected to the network at the time, and the like. As discussed above, these exogenous factors can affect the accuracy of the positioning techniques.

At block 425, the management system trains a machine learning model based on the location information and/or exogenous factors. For example, the management system may use the exogenous factors and/or location information (e.g., the ground truth location, or the position estimation(s) as input, and the identified best positioning technique (or the ranked techniques) as the target output. In this way, the model learns to predict which positioning technique is most accurate, given the actual location and exogenous factors.

At block 430, the management system determines whether there is additional location information available to train the model. If so, the method 400 returns to block 405. If not, the method 400 continues to block 435. In some embodiments, various other termination criteria may be used to end the training, such as a maximum amount of time or computational resources spent training, a minimum model accuracy (determined using test data), and the like. Although an iterative process is depicted for conceptual clarity, where each exemplar of training information is processed to refine the model individually (e.g., using stochastic gradient descent), in some aspects, the management system may use batches of data (e.g., and batch gradient descent) to refine the model.

At block 435, the management system deploys the trained model for runtime inferencing (e.g., to identify or predict the most accurate positioning technique during runtime).

FIG. 5 is a flow diagram depicting an example method 500 for using machine learning models to provide improved management of positioning techniques. In some embodiments, the method 500 is performed by a management system, such as the management system 210 of FIG. 2.

At block 505, the management system receives location information from a mobile device during runtime. In one embodiment, the location information corresponds to a specific region in a physical space (e.g., determined by scanning a QR code on the floor). Using this specific region, the management system can select which positioning technique will provide the most accurate location estimations (e.g., once the mobile device moves away from the QR code).

In some embodiments, the location information corresponds to one or more location estimations (each generated with a corresponding positioning technique). By processing the location estimation (e.g., the corresponding region) as input to a model, the management system may be able to determine which positioning technique is most accurate for the region, as discussed above and below in more detail.

At block 510, the management system determines one or more current exogenous factors. As discussed above, the exogenous factors generally correspond to things that can affect positioning accuracy, such as the time of day or day of the week, presence of other devices or objects, channel utilization, and the like.

At block 515, the management system then predicts the best or most accurate positioning technique(s) using the trained machine learning model. For example, as discussed above, the management system can process the actual location (e.g., determined via QR code) and exogenous factors with the model to generate or identify the most accurate positioning technique for the place and time.

In some embodiments, the management system can alternatively use each location estimation as the input region (along with the exogenous factors) to predict which location estimation is most accurate for the region. For example, if the management system receives three location estimations (each generated using a respective positioning technique), the management system may identify the number of unique regions indicated in the data and process these region(s) as input. As an example, if all three techniques estimate that the mobile device is in a given region, the management system can simply process this region using the model (along with exogenous factors) to identify the most accurate positioning technique for the region (or the most accurate technique that the mobile device is capable of using).

Similarly, if two or more regions are reflected in the location estimations, the management system may process each in turn (alongside exogenous data) using the model to identify the most accurate positioning technique(s) for each. If the model indicates the same positioning technique as the most accurate for all of the alternative regions, this technique may be identified as the most accurate one. In some embodiments, if two or more alternative positioning techniques are indicated, the management system may evaluate the accuracy of each for each alternative region to select the overall most accurate technique. For example, suppose a first technique is predicted to be the most accurate for a first region and the least accurate for a second, while a second technique is predicted to be the second-most accurate technique for both the first and second regions. In some embodiments, the management system selects the second technique for use, as it is likely to be more accurate in the aggregate, as compared to the first.

Generally, the management system can use the identified most accurate positioning technique for any subsequent operations of the mobile device. For example, when determining the location of the device, the management system may use only the identified most-accurate technique, as opposed to simply averaging the location estimations or using other criteria to select the location.

At block 520, the management system can optionally indicate, to the mobile device, which positioning technique (s) are most accurate for the current location (and given the current exogenous factors). Similarly to the management system, the mobile device may use this information to improve its operations, such as by refraining from using less accurate techniques. In some embodiments, the mobile device selectively activates/deactivates the unused positioning systems, thereby reducing the power consumption and computational expense on the device.

Figure 6:
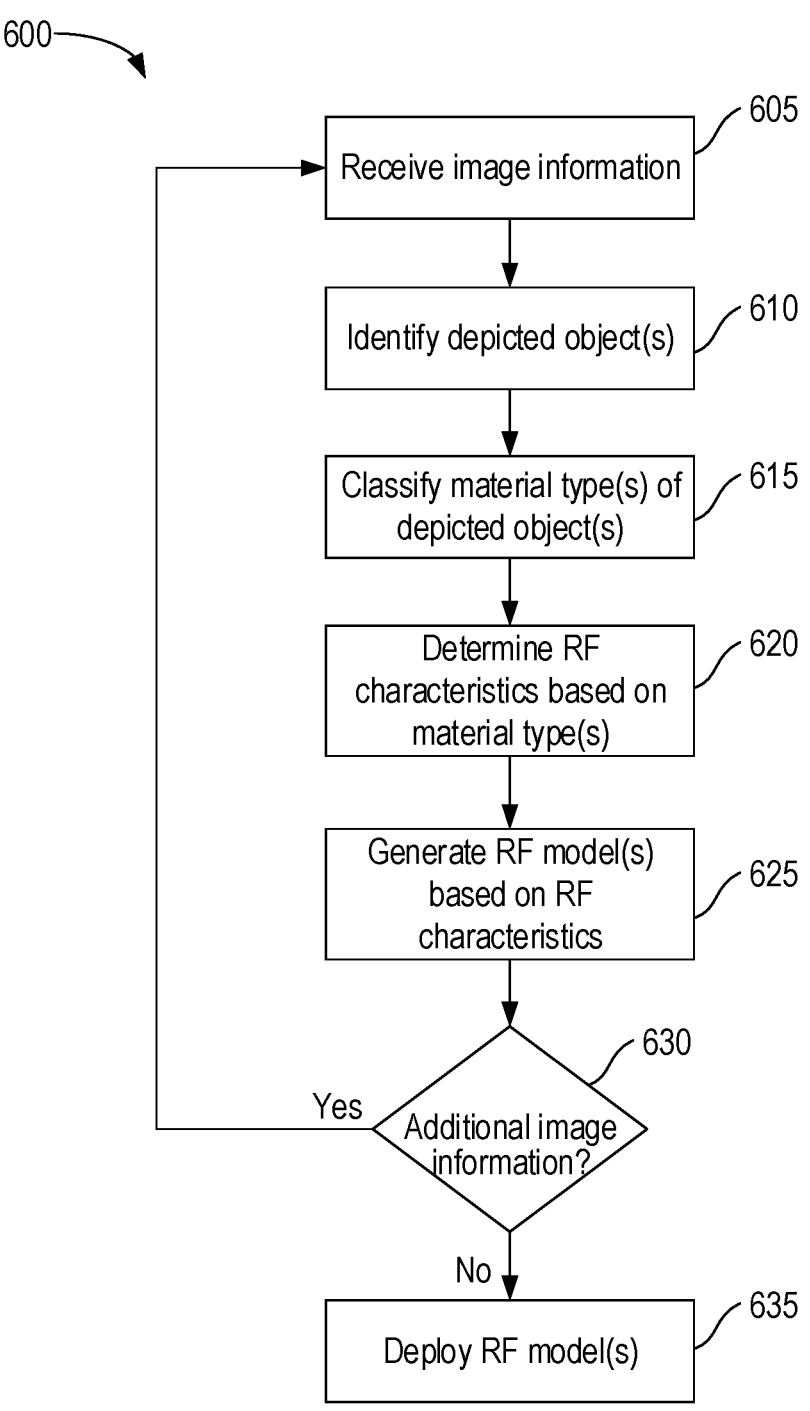
FIG. 6 is a flow diagram depicting an example method for using machine learning to drive improved RF management.

FIG. 6 is a flow diagram depicting an example method 600 for using machine learning to drive improved RF management. In some embodiments, the method 600 is performed by a management system, such as the management system 210 of FIG. 2. In at least one embodiment, some or all of the depicted operations may be performed by a mobile device, such as mobile device 205 of FIG. 2.

At block 605, the management system (or mobile device) receives image information from a mobile device. For example, as discussed above, the mobile device may capture images as it traverses a physical space, where these images may depict various objects or obstacles in the space.

At block 610, the management system (or mobile device) identifies object(s) depicted in the image(s). A variety of object recognition techniques and models may be used to perform this recognition. At block 615, the management system can classify each identified object using a trained machine learning model (e.g., a material classifier). Although depicted as discrete operations for conceptual clarity, in some aspects, detecting the objects and classifying them based on material type can be performed using a single model.

For example, as discussed above, the management system may use the classifier model to identify various objects such as forklifts, concrete walls, drywall-covered walls, steel shelves, elevators, stairs, and the like.

At block 620, the management system determines the RF characteristics of each identified object/material type. For example, the management system can evaluate a predefined set of RF characteristics indicated for each object (e.g., the RF characteristics of an elevator shaft, the RF characteristics of a steel shelf or a wooden shelf, and the like).

At block 625, the management system then generates an RF model (e.g., a heatmap) based on the determined RF characteristics. For example, based on the determined location, orientation, size, and material type of each object, the management system can augment the RF model to indicate the characteristics of the environment, such as the expected path loss, reflectivity, and the like.

In some embodiments, as discussed above, the management system may refrain from considering mobile objects when generating the RF model. That is, for any detected objects on a predefined list of mobile objects, the management system may exclude these objects from the model (as they may or may not be present at any given time).

In some embodiments, the management system may additionally or alternatively use a sequence of data (e.g., collected over time or days) to predict whether any mobile objects will be present in the space at any given time or day. For example, the management system may use regression to predict whether a given mobile object will be present, and generate the RF model to include the object when it is predicted to be present, and exclude it when it is predicted to be absent.

At block 630, the management system determines whether there is additional image information available to generate the RF model (e.g., more images captured by the same mobile device or by another mobile device, in the same location or in a different location). If more information is available, the method 600 returns to block 605. If not, the method 600 continues to block 635.

At block 635, the management system can deploy the RF model for use. For example, as discussed above, the management system can use the RF model to define the RF parameters used by the AP(s) and/or client devices in the space, so as to mitigate or reduce the impact of the various detected objects. This can improve the operations of the network itself. Similarly, in some aspects, the RF model can be used to help select the most accurate positioning techniques (or to adjust the predictions returned by one or more positioning techniques), as discussed above.

FIG. 7 is a flow diagram depicting an example method 700 for training machine learning models to improve positioning techniques. In some embodiments, the method 700 is performed by a management system, such as the management system 210 of FIG. 2.

At block 705, a plurality of location estimations generated using a plurality of positioning techniques for a first region of a physical space is received.

At block 710, a time period when the plurality of location estimations were collected is determined.

At block 715, one or more exogenous factors for the physical space during the determined time period are identified.

At block 720, a machine learning model is trained, based on the plurality of location estimations and the one or more exogenous factors, to predict positioning technique accuracy.

FIG. 8 is a flow diagram depicting an example method 800 for using machine learning to improve positioning techniques. In some embodiments, the method 800 is performed by a management system, such as the management system 210 of FIG. 2.

At block 805, an indication that a mobile device is in a first region of a physical space is received.

At block 810, one or more current exogenous factors for the physical space are determined.

At block 815, positioning technique accuracy for each respective positioning technique of a plurality of positioning techniques is predicted by processing the indication of the first region and the one or more current exogenous factors using a machine learning model.

At block 820, a first positioning technique of the plurality of positioning techniques is selected based on the predicted positioning technique accuracies.

Figure 9:
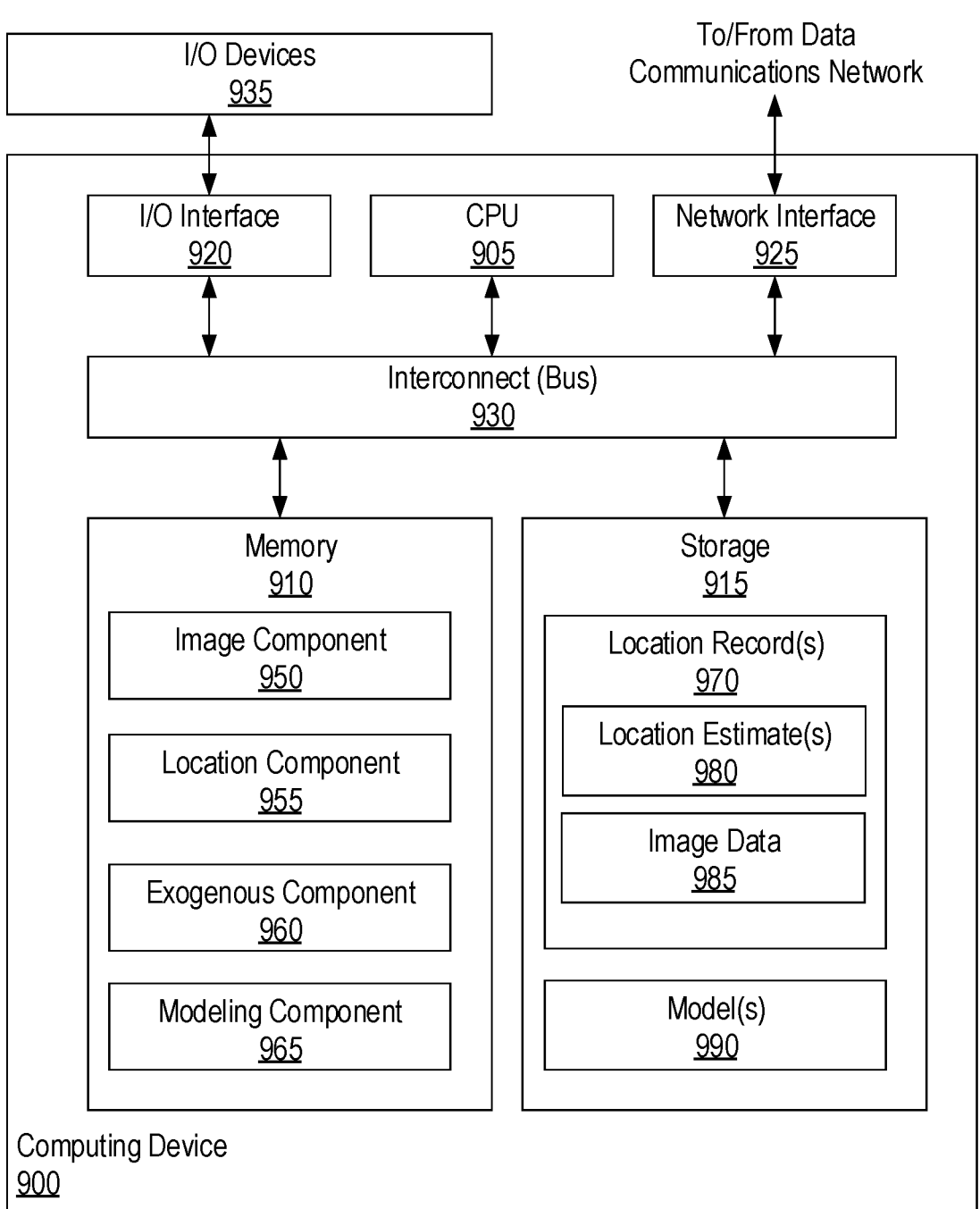
FIG. 9 depicts an example computing device configured to perform various aspects of the present disclosure.

FIG. 9 depicts an example computing device 900 configured to perform various aspects of the present disclosure. Although depicted as a physical device, in embodiments, the computing device 900 may be implemented using virtual device(s), and/or across a number of devices (e.g., in a cloud environment). In one embodiment, the computing device 900 corresponds to the management system 210 of FIG. 2.

As illustrated, the computing device 900 includes a CPU 905, memory 910, storage 915, a network interface 925, and one or more I/O interfaces 920. In the illustrated embodiment, the CPU 905 retrieves and executes programming instructions stored in memory 910, as well as stores and retrieves application data residing in storage 915. The CPU 905 is generally representative of a single CPU and/or GPU, multiple CPUs and/or GPUs, a single CPU and/or GPU having multiple processing cores, and the like. The memory 910 is generally included to be representative of a random access memory. Storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 935 (such as keyboards, monitors, etc.) are connected via the I/O interface(s) 920. Further, via the network interface 925, the computing device 900 can be communicatively coupled with one or more other devices and components (e.g., via a network, which may include the Internet, local network(s), and the like). As illustrated, the CPU 905, memory 910, storage 915, network interface(s) 925, and I/O interface(s) 920 are communicatively coupled by one or more buses 930.

In the illustrated embodiment, the memory 910 includes an image component 950, a location component 955, an exogenous component 960, and a modeling component 965, which may perform one or more embodiments discussed above. Although depicted as discrete components for conceptual clarity, in embodiments, the operations of the depicted components (and others not illustrated) may be combined or distributed across any number of components. Further, although depicted as software residing in memory 910, in embodiments, the operations of the depicted components (and others not illustrated) may be implemented using hardware, software, or a combination of hardware and software.

In one embodiment, the image component 950 is used to evaluate images, as discussed above. For example, the image component may use one or more machine learning models (e.g., stored in the models 990) to classify objects depicted in the images based on their type and/or material type, may identify the location, shape, size, and/or orientation of the objects, and the like. The location component 955 may generally be used to evaluate various location data, such as the actual ground-truth location and various position estimates, as discussed above. For example, the location component 955 may evaluate the accuracies of each alternative positioning technique based on the ground-truth. The exogenous component 960 may be configured to determine exogenous factors (e.g., channel utilization) for prior times (e.g., when training the model) and/or current times (e.g., when inferencing), as discussed above. The modeling component 965 may generally be used to generate, train, update, and/or use machine learning models (e.g., models 990). For example, the modeling component 965 may use the image data (e.g., determined material types and/or RF characteristics) to generate RF models, as discussed above. Similarly, the modeling component 965 may use the location information to train positioning models that predict the most accurate positioning technique, and/or to select a positioning technique using trained models.

In the illustrated example, the storage 915 includes a set of location records 970, each of which include one or more location estimates 980 and image data 985. For example, each location record 970 may correspond to a physical region in the space (e.g., a region 115 of FIG. 1), and the corresponding location estimates 980 may be predicted locations (e.g., generated using RTLS techniques) by one or more mobile devices in the physical location at one or more points in time. Similarly, the image data 985 may include images (or the objects detected in the images) generated or captured in the location.

The storage 915 also includes one or more models 990, such as object detection and/or classification models (e.g., for the images), RF propagation models (e.g., generated based on the image data), models trained to predict the most accurate positioning technique(s), and the like. Although depicted as residing in storage 915, the location records 970 and models 990 may be stored in any suitable location, including memory 910.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

receiving location information comprising a plurality of location estimations generated using a plurality of positioning techniques for a first region of a physical space and a plurality ground truth locations corresponding to the plurality of location estimations;

identifying, for the first region, a most accurate position technique of the plurality of positioning techniques based on the plurality of location estimations and the plurality of ground truth locations;

determining a time period when the plurality of location estimations were collected;

determining exogenous data for the physical space during the determined time period; and training a machine learning model, based on the location information, the most accurate position technique, and the exogenous data, to predict positioning technique accuracy, comprising processing the exogenous data and at least a subset of the location information as input to the machine learning model.

2. The method of claim 1, further comprising, for each respective region of a plurality of regions in the physical space:

receiving a respective plurality of location estimations generated using the plurality of positioning techniques; and training the machine learning model based further on the respective plurality of location estimations.

3. The method of claim 1, further comprising:

receiving an indication that a mobile device is in the first region of the physical space;

determining current exogenous data for the physical space;

predicting a respective positioning technique accuracy for each respective positioning technique of the plurality of positioning techniques by processing an identifier of the first region and the current exogenous data using the machine learning model; and selecting a first positioning technique of the plurality of positioning techniques based on the predicted respective positioning technique accuracies.

4. The method of claim 3, wherein the mobile device selectively activates each of the plurality of positioning techniques based on the predicted positioning technique accuracies generated by the machine learning model.

5. The method of claim 1, wherein the exogenous data comprises at least one of:

(i) a time of day;

(ii) a day of week;

(iii) a received signal strength indicator (RSSI);

(iv) a channel utilization; or (v) a number of devices in the physical space.

6. The method of claim 1, further comprising:

receiving one or more images captured in the first region of the physical space;

processing the one or more images using a second machine learning model to identify material types of one or more objects depicted in the one or more images;

determining, for each object detected in the one or more images, corresponding radio frequency (RF) characteristics based on the identified material types; and generating a predictive RF propagation model based at least in part on the determined corresponding RF characteristics.

7. The method of claim 6, further comprising:

determining, based on the one or more images, that a first object depicted in at least one of the one or more images is mobile;

training a third machine learning model to predict whether the first object will be present in the first region based at least in part on time of day; and generating the predictive RF propagation model based further on predictions generated by the third machine learning model.

8. The method of claim 6, further comprising reconfiguring at least one of a radio resource management (RRM) system or a real-time location system (RTLS) based on the predictive RF propagation model.

9. The method of claim 1, wherein the plurality of positioning techniques comprise at least one of:

an angle-of-arrival (AoA) positioning technique;

an angle-of-departure (AoD) positioning technique;

an ultra-wideband (UWB) positioning technique;

a global positioning system (GPS) positioning technique;

a location management function (LMF) positioning technique;

a time-of-flight (ToF) positioning technique; or a signal strength positioning technique.

10. A non-transitory computer-readable medium containing computer program code that, when executed by one or more computer processors, performs an operation comprising:

receiving location information comprising a plurality of location estimations generated using a plurality of positioning techniques for a first region of a physical space and a plurality ground truth locations corresponding to the plurality of location estimations;

identifying, for the first region, a most accurate position technique of the plurality of positioning techniques based on the plurality of location estimations and the plurality of ground truth locations;

determining a time period when the plurality of location estimations were collected;

determining exogenous data for the physical space during the determined time period; and training a machine learning model, based on the location information, the most accurate position technique, and the exogenous data, to predict positioning technique accuracy, comprising processing the exogenous data and at least a subset of the location information as input to the machine learning model.

11. The non-transitory computer-readable medium of claim 10, the operation further comprising:

receiving an indication that a mobile device is in the first region of the physical space;

determining current exogenous data for the physical space;

predicting a respective positioning technique accuracy for each respective positioning technique of the plurality of positioning techniques by processing an identifier of the first region and the current exogenous data using the machine learning model; and selecting a first positioning technique of the plurality of positioning techniques based on the predicted respective positioning technique accuracies.

12. The non-transitory computer-readable medium of claim 10, the operation further comprising, for each respective region of a plurality of regions in the physical space:

receiving a respective plurality of location estimations generated using the plurality of positioning techniques; and training the machine learning model based further on the respective plurality of location estimations.

13. The non-transitory computer-readable medium of claim 10, the operation further comprising:

receiving one or more images captured in the first region of the physical space;

processing the one or more images using a second machine learning model to identify material types of one or more objects depicted in the one or more images;

determining, for each object detected in the one or more images, corresponding radio frequency (RF) characteristics based on the identified material types; and generating a predictive RF propagation model based at least in part on the determined corresponding RF characteristics.

14. The non-transitory computer-readable medium of claim 13, the operation further comprising:

determining, based on the one or more images, that a first object depicted in at least one of the one or more images is mobile;

training a third machine learning model to predict whether the first object will be present in the first region based at least in part on time of day; and generating the predictive RF propagation model based further on predictions generated by the third machine learning model.

15. The non-transitory computer-readable medium of claim 13, the operation further comprising reconfiguring at least one of a radio resource management (RRM) system or a real-time location system (RTLS) based on the predictive RF propagation model.

16. A system, comprising:

one or more computer processors; and a memory containing a program which when executed by the one or more computer processors performs an operation, the operation comprising:

receiving location information comprising a plurality of location estimations generated using a plurality of positioning techniques for a first region of a physical space and a plurality ground truth locations corresponding to the plurality of location estimations;

identifying, for the first region, a most accurate position technique of the plurality of positioning techniques based on the plurality of location estimations and the plurality of ground truth locations;

determining a time period when the plurality of location estimations were collected;

determining exogenous data for the physical space during the determined time period; and training a machine learning model, based on the location information, the most accurate position technique, and the exogenous data, to predict positioning technique accuracy, comprising processing the exogenous data and at least a subset of the location information as input to the machine learning model.

17. The system of claim 16, the operation further comprising:

receiving an indication that a mobile device is in the first region of the physical space;

determining current exogenous data for the physical space;

predicting a respective positioning technique accuracy for each respective positioning technique of the plurality of positioning techniques by processing an identifier of the first region and the current exogenous data using the machine learning model; and selecting a first positioning technique of the plurality of positioning techniques based on the predicted respective positioning technique accuracies.

18. The system of claim 16, the operation further comprising, for each respective region of a plurality of regions in the physical space:

receiving a respective plurality of location estimations generated using the plurality of positioning techniques; and training the machine learning model based further on the respective plurality of location estimations.

19. The system of claim 16, the operation further comprising:

receiving one or more images captured in the first region of the physical space;

processing the one or more images using a second machine learning model to identify material types of one or more objects depicted in the one or more images;

determining, for each object detected in the one or more images, corresponding radio frequency (RF) characteristics based on the identified material types; and generating a predictive RF propagation model based at least in part on the determined corresponding RF characteristics.

20. The system of claim 19, the operation further comprising:

determining, based on the one or more images, that a first object depicted in at least one of the one or more images is mobile;

training a third machine learning model to predict whether the first object will be present in the first region based at least in part on time of day; and generating the predictive RF propagation model based further on predictions generated by the third machine learning model.

* * * * *